United States Patent
Becker et al.

(10) Patent No.: US 10,682,720 B2
(45) Date of Patent: Jun. 16, 2020

(54) WELDING SYSTEMS AND DEVICES HAVING A CONFIGURABLE PERSONAL COMPUTER USER INTERFACE

(71) Applicant: Illinois Tool Works Inc., Glenview, IL (US)

(72) Inventors: William Joshua Becker, Manitowoc, WI (US); Alan Edward Stein, Little Chute, WI (US); John Alan Luck, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1330 days.

(21) Appl. No.: 13/969,043

(22) Filed: Aug. 16, 2013

(65) Prior Publication Data

US 2014/0069900 A1    Mar. 13, 2014

Related U.S. Application Data

(60) Provisional application No. 61/698,364, filed on Sep. 7, 2012.

(51) Int. Cl.
*B23K 9/10* (2006.01)
*B23K 9/095* (2006.01)

(52) U.S. Cl.
CPC .......... *B23K 9/0953* (2013.01); *B23K 9/1062* (2013.01); *B23K 9/1087* (2013.01)

(58) Field of Classification Search
CPC .. B23K 9/0953; B23K 9/1062; B23K 9/1087; B23K 9/1043; B23K 9/1056;
(Continued)

(56) References Cited

U.S. PATENT DOCUMENTS

| 4,020,907 A | 5/1977 | Luck |
| 4,484,059 A | 11/1984 | Lillquist |

(Continued)

FOREIGN PATENT DOCUMENTS

| CN | 1255684 | 6/2000 |
| CN | 1841321 | 10/2006 |

(Continued)

OTHER PUBLICATIONS

International Search Report for PCT application No. PCT/US2013/058592 dated May 2, 2014, 16 pgs.

*Primary Examiner* — Dana Ross
*Assistant Examiner* — Joseph M Baillargeon
(74) *Attorney, Agent, or Firm* — McAndrews, Held & Malloy, Ltd.

(57) ABSTRACT

A welding system includes a welding power source having a user interface disposed thereon and a weld controller disposed therein and being adapted to generate a welding power output for use in a welding operation. The welding system also includes a personal computer having control circuitry disposed therein and being removably interfaced with the welding power source via a docking mechanism. When the personal computer is docked within the docking mechanism, the personal computer is enabled for receiving operator input, and the control circuitry communicates with the weld controller to coordinate control of a welding operation in accordance with the operator input.

5 Claims, 5 Drawing Sheets

(58) Field of Classification Search
CPC ........... B23K 9/1006–1075; B23K 11/24–248;
B23K 13/08; B23K 37/0258; B23K
9/1075; B23K 9/1068; G06F 13/4282;
G06F 1/266
USPC ........ 219/130.1, 132, 125.1, 130.21, 121.83,
219/137 PS, 110, 121.62, 121.34, 130.5;
709/227, 219; 713/156; 725/43; 901/9;
345/156
See application file for complete search history.

(56) References Cited

U.S. PATENT DOCUMENTS

| | | | |
|---|---|---|---|
| 4,998,005 A | 3/1991 | Rathi | |
| 5,500,512 A | 3/1996 | Goldblatt | |
| 5,651,903 A | 7/1997 | Shirk | |
| 5,889,671 A | 3/1999 | Autermann | |
| 6,002,104 A | 12/1999 | Hsu | |
| 6,091,048 A | 7/2000 | Lanouette | |
| 6,096,994 A | 8/2000 | Handa | |
| 6,130,407 A | 10/2000 | Villafuerte | |
| 6,242,711 B1 | 6/2001 | Cooper | |
| 6,248,975 B1 | 6/2001 | Lanouette | |
| 6,267,291 B1 | 7/2001 | Blankenship | |
| 6,369,952 B1 * | 4/2002 | Rallison | G02B 27/017 359/630 |
| 6,476,354 B1 | 11/2002 | Jank | |
| 6,479,793 B1 | 11/2002 | Wittmann | |
| 6,510,984 B2 | 1/2003 | Blankenship | |
| 6,515,251 B1 | 2/2003 | Wind | |
| 6,536,660 B2 | 3/2003 | Blankenship | |
| 6,552,303 B1 | 4/2003 | Blankenship | |
| 6,563,085 B2 | 5/2003 | Lanouette | |
| 6,583,386 B1 | 6/2003 | Ivkovich | |
| 6,700,097 B1 | 3/2004 | Hsu | |
| 6,708,877 B2 | 3/2004 | Blankenship | |
| 6,710,299 B2 | 3/2004 | Blankenship | |
| 6,750,428 B2 | 6/2004 | Okamoto | |
| 6,852,949 B2 | 2/2005 | Lanouette | |
| 7,032,814 B2 | 4/2006 | Blankenship | |
| 7,089,337 B2 | 8/2006 | Senoo | |
| 7,130,255 B2 | 10/2006 | Smith | |
| 7,220,941 B2 * | 5/2007 | Niedereder | B23K 9/0953 219/130.5 |
| 7,342,210 B2 | 3/2008 | Fergason | |
| 7,369,156 B1 * | 5/2008 | Heinke | G01J 5/02 340/870.07 |
| 7,501,613 B2 | 3/2009 | Fergason | |
| 7,510,047 B2 | 3/2009 | Muto | |
| 7,510,151 B2 | 3/2009 | Perez-Sanchez | |
| 7,518,088 B2 * | 4/2009 | Aimi | B23K 11/24 219/130.21 |
| 7,550,689 B2 | 6/2009 | Wech | |
| 8,338,743 B2 | 12/2012 | Wanner | |
| 8,569,655 B2 | 10/2013 | Cole | |
| 2004/0050905 A1 | 3/2004 | Endo | |
| 2004/0232128 A1 | 11/2004 | Niedereder | |
| 2005/0002083 A1 | 1/2005 | Fergason | |
| 2005/0007504 A1 | 1/2005 | Fergason | |
| 2005/0007667 A1 | 1/2005 | Fergason | |
| 2005/0017152 A1 | 1/2005 | Fergason | |
| 2005/0205647 A1 | 9/2005 | Wang | |
| 2006/0027980 A1 | 2/2006 | Hiestand | |
| 2006/0207980 A1 | 9/2006 | Jacovetty | |
| 2007/0080149 A1 | 4/2007 | Albrecht | |
| 2007/0080152 A1 | 4/2007 | Albrecht | |
| 2007/0080153 A1 | 4/2007 | Albrecht | |
| 2007/0089215 A1 | 4/2007 | Biche | |
| 2007/0158319 A1 | 7/2007 | Connally | |
| 2007/0262065 A1 | 11/2007 | Peters | |
| 2008/0041553 A1 | 2/2008 | Snyder | |
| 2008/0061049 A1 | 3/2008 | Albrecht | |
| 2008/0116186 A1 | 5/2008 | Luck | |
| 2008/0158502 A1 * | 7/2008 | Becker | A61F 9/067 351/44 |
| 2009/0071949 A1 | 3/2009 | Harris | |
| 2009/0120919 A1 * | 5/2009 | O'Donnell | B23K 9/188 219/130.1 |
| 2009/0152251 A1 | 6/2009 | Dantinne | |
| 2009/0276930 A1 * | 11/2009 | Becker | A61F 9/06 2/8.2 |
| 2009/0298024 A1 | 12/2009 | Batzler | |
| 2010/0086003 A1 | 4/2010 | Pfitzner | |
| 2010/0217440 A1 | 8/2010 | Lindell | |
| 2011/0073569 A1 * | 3/2011 | Rappl | B23K 9/095 219/73.2 |
| 2011/0117527 A1 | 5/2011 | Conrardy | |
| 2013/0157478 A1 * | 6/2013 | Naufel | H01R 12/7082 439/59 |

FOREIGN PATENT DOCUMENTS

| | | |
|---|---|---|
| CN | 2832401 Y | 11/2006 |
| CN | 201493592 | 6/2010 |
| CN | 102059433 | 5/2011 |
| CN | 102239025 | 11/2011 |
| CN | 102298858 | 12/2011 |
| CN | 102371414 | 3/2012 |
| CN | 102458748 | 5/2012 |
| CN | 102601493 | 7/2012 |
| DE | 19624027 | 12/1997 |
| EP | 1445055 | 8/2004 |
| EP | 1486283 A1 | 12/2004 |
| EP | 1683599 | 7/2006 |
| JP | 3024700 | 3/2000 |
| JP | 2000176675 | 6/2000 |
| WO | 2010142858 | 12/2010 |

* cited by examiner

WELDING SYSTEMS AND DEVICES HAVING A CONFIGURABLE PERSONAL COMPUTER USER INTERFACE

CROSS REFERENCE TO RELATED APPLICATIONS

This application is a U.S. Nonprovisional Patent Application of U.S. Provisional Application No. 61/698,364, entitled "Welding Systems and Devices Having a Configurable Personal Computer User Interface", filed Sep. 7, 2012, which is herein incorporated by reference.

BACKGROUND

The invention relates generally to welding systems and, more particularly, to welding systems having a configurable user interface disposed on a personal computer.

Welding is a process that has increasingly become ubiquitous in many industries. While such processes may be automated in certain contexts, a large number of applications continue to exist for manual welding operations performed by skilled welding technicians. Traditional process welding systems support a variety of processes, such as metal inert gas (MIG) welding, tungsten inert gas (TIG) welding, stick welding, and so forth, which may operate in different modes, such as constant current or constant voltage. These power sources provide conditioned power for the welding application, and features of this provided power are governed by one or more settings input by a welding operator.

Many welding applications, such as welding of aerospace parts, require the operator to utilize a TIG process, typically for finer or more intricate welds. Such intricate forms of welding a desired part may be sensitive to a variety of weld conditions and parameters, and, accordingly, it may be necessary for an operator to specify a large number of parameters prior to the welding operation. In some cases, each time a welding operator performs a given weld, the welding operator must repeat the set up process for the welding power source, thus reducing the efficiency and accuracy of the welding process, particularly in instances in which the weld to be performed in similar to a previously performed weld. Further, in some instances, the welding operator may need several different setups for the welding of a single part, particularly in cases in which a given procedure has multiple steps. Accordingly, there exists a need for systems that enable a more efficient setup procedure for the operator to follow with minimal inconvenience for the welding operator, particularly in environments where the welding operation is intricate.

BRIEF DESCRIPTION

In an embodiment, a welding system includes a welding power source having a user interface disposed thereon and a weld controller disposed therein adapted to generate a welding power output for use in a welding operation. The welding system also includes a computer having control circuitry removably interfaced with the welding power source via a docking mechanism. When the computer is docked within the docking mechanism, the user interface is disabled, the computer is enabled for receiving operator input, and the control circuitry communicates with the weld controller to coordinate control of a welding operation in accordance with the operator input.

In another embodiment, a retrofit kit for a welding system includes a universal serial bus hub adapted to couple to a universal serial bus port on a personal computer to receive a universal serial bus data stream from the personal computer. The retrofit kit also includes a universal serial bus to RS485 converter adapted to be coupled to the universal serial bus hub and disposed within a welding power source to convert the universal serial bus data stream to a RS485 data stream. The universal serial bus to RS485 converter is adapted to couple to control circuitry within the welding power source to communicate the RS485 data stream to the control circuitry. A power supply kit is also provided in the retrofit kit and is adapted to couple the personal computer to an input power circuit of the welding power source at a location upstream of a power switch of the welding power source.

In another embodiment, a welding system includes a welding power source including a weld controller and a first user interface having a plurality of activatable interface devices disposed thereon. The welding power source is adapted to generate a welding power output for use in a welding operation. The welding system also includes a personal computer integrated with the welding power source and having control circuitry disposed therein and a second user interface. The control circuitry within the personal computer is adapted to receive operator input, to communicate with the weld controller to selectively activate one or more of the activatable interface devices on the first user interface based on the received operator input, and to communicate with the weld controller to coordinate control of the weld operation based on the inputs received via the second user interface and the activated interface devices on the first user interface.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments of welding systems include a welding power source and an external computer, such as a personal computer. In some embodiments, the computer may be removably interfaced with the welding power source, such as in a docking mechanism disposed in the welding power source. For example, in one embodiment, the computer may dock in the welding power source and, when docked, an interface on the welding power source may be locked out or disabled from use. Instead, in such instances, the computer may be utilized as the operator interface. However, in other embodiments, the computer may be configured for use in conjunction with the user interface disposed on the welding power source. The foregoing embodiments may enable the computer to be utilized as a configurable user interface, for example, by storing multiple customized user profiles or setup procedures, as described in more detail below.

Figure 1:
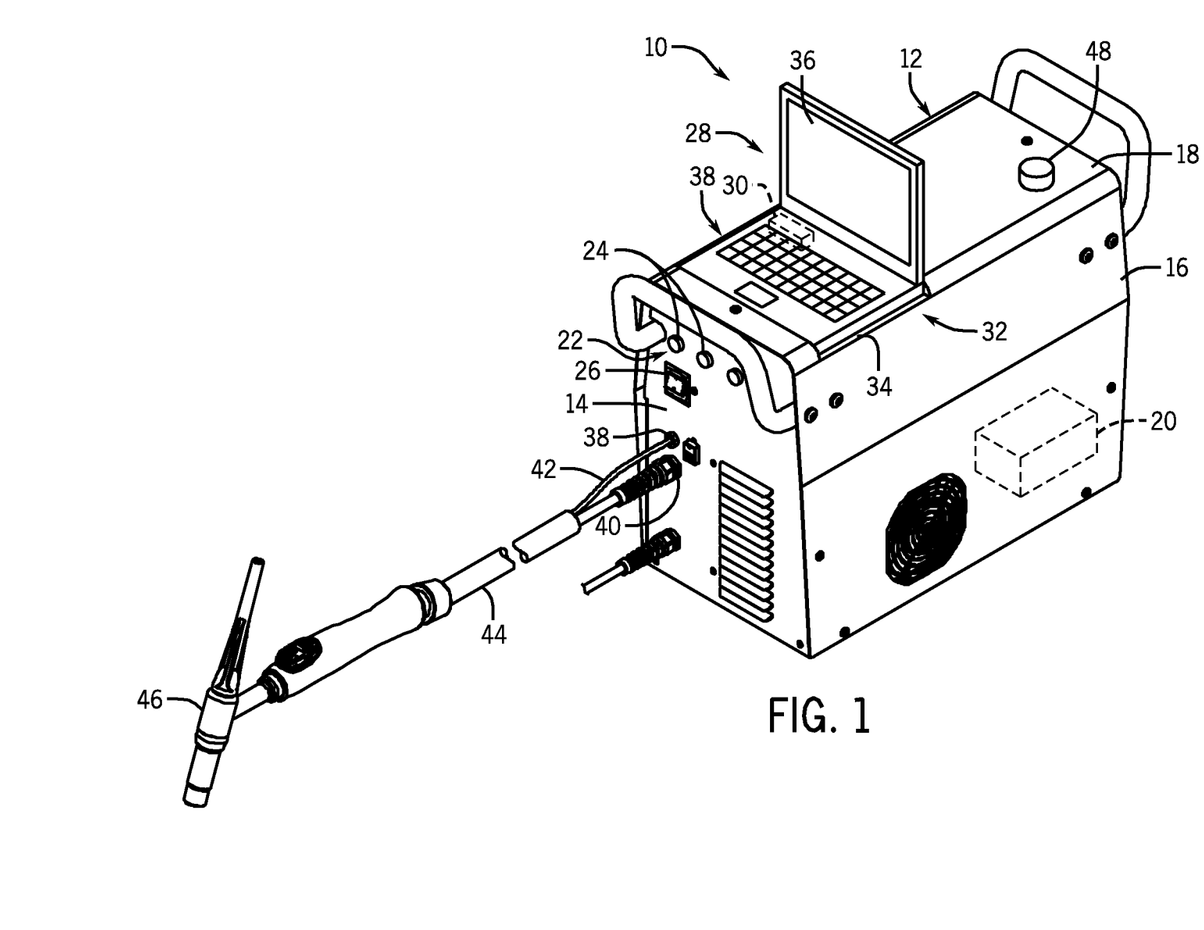
FIG. 1 is a perspective view of an embodiment of a welding system including a welding power source and a personal computer docked in the welding power source having a user interface.

Turning now to the drawings, FIG. 1 is a perspective view of a welding system 10 including a welding power source 12 configured to provide a power output for a tungsten inert gas (TIG) welding operation (or a stick welding operation). However, it should be noted that in other embodiments, the welding power source may be configured to produce power for any desirable type of welding operation (e.g., metal inert gas (MIG) welding). In certain embodiments, the power source 12 may supply a direct current (DC) or alternating current (AC) to a welding torch, depending on the desired application. For example, an AC current may be suited for welding aluminum or magnesium, and a DC current may be suited for welding stainless steels, nickel or titanium. In addition to matching the current to the material selection, the output of the power source 12 may be varied to obtain desired weld characteristics. For example, a low AC frequency (e.g., approximately 56 Hz) current may generate a wide arc with shallow penetration of a workpiece, while a high AC frequency (e.g., approximately 200 Hz) current may generate a focused arc with deeper penetration into a workpiece.

In the illustrated embodiment, the welding power source 12 includes a front panel 14, a side panel 16, a top panel 18, and a weld controller 20 disposed therein. In the embodiment illustrated in FIG. 1, the front panel 14 includes a control panel 22 having a plurality of electronically activatable interface devices 24 and an ON/OFF switch 26. In the illustrated embodiment, the electronically activatable interface devices 24 are knobs. However, in other embodiments, the devices 24 may be any suitable electronically activatable device that enables a user to input a desired parameter or feature into the power source 12, such as knobs, switches, displays, buttons, etc. In certain embodiments, an operator may control one or more parameters of the welding operation at least partially through the use of control panel 22, for example, via coordination with the weld controller 20.

As illustrated, an external computer 28 having control circuitry 30 is shown docked within a docking mechanism 32 of the welding power source 12. The external computer may comprise any suitable format, and employ any desired software, operating system, connectivity and data exchange protocols, and so forth. For example, the external computer may comprise a personal computer, laptop computer, handheld computer (e.g., tablet computer, smart phone, etc.). Such devices are sometimes referred to herein generically by the term "personal computer". In the illustrated embodiment, the docking mechanism 32 is provided in the form of a recess 34 formed in the top panel 18 of the welding power source 12. However, in other embodiments, the docking mechanism 32 may be provided in any suitable form, such as in the form of a bracket that couples to the top surface 18 of the welding power source 12, a mounted device that receives the personal computer 28 and is coupled to a side of the welding power source 12, and so forth.

Regardless of the form of the docking mechanism 32, however, in certain embodiments, when the personal computer 28 is docked, the user interface 22 may be disabled, and the personal computer 28 may be enabled for receiving operator inputs. In such embodiments, the control circuitry 30 may then communicate with the weld controller 20 to coordinate control of a welding operation in accordance with the input received from the operator via the personal computer 28. Further, to facilitate the process of receiving the operator input, the personal computer 28 may include a screen 36 and a keyboard 38. In some embodiments, the screen 36 may be configured as a touch screen interface through which the welding operator may input desired weld parameters.

In other embodiments, when the personal computer 28 is docked within the docking mechanism 32, some or all of the activatable interface devices 24 may be selectively activated by the weld controller 20 or the control circuitry 30, and the welding operator may input desired weld parameters via the activated devices on the interface 22 and/or via the personal computer 28. For example, in some embodiments, an end user may purchase a variety of software packages for the personal computer 28, each corresponding to a different set of purchased functionalities. In order to enable the purchased functionalities, some or all of the interface 22 may be activated for use. Further, in some instances, features of the interface on the personal computer 28 may cooperate with features on the interface 22 to provide a complete interface that may be utilized by the operator.

The foregoing features of the illustrated welding system 10 may enable a variety of functionalities that may be desirable in a welding environment. For example, by providing the personal computer 28 as an integrated part of the welding system 10, one or more end users may be able to configure and personalize a user interface for use during the welding operation. In some instances, the users may store personalized profiles, preferences, weld routines, and so forth on the personal computer 28. To that end, the personal computer 28 and/or the welding power source 12 may include memory devices that store such information. For further example, additional data that may be useful to the user prior to or during welding, such as user's manuals, training protocols, help desk questions and answers, and so forth, may be stored on the computer and accessed as desired.

In additional to the user interfaces provided on the welding power source 12, the welding power source 12 further includes a variety of receptacles that interface with one or more welding devices and/or accessories. For example, in the illustrated embodiment, receptacles 38 and 40 receive cables 42 and 44, respectively, which connect the welding power source 12 to a welding torch 46. Additional receptacles may be provided to couple the power source 12 to other devices, such as a receptacle that receives a cable that terminates in a work clamp. During a typical welding operation, the work clamp connects to a workpiece to close the circuit between the welding power source 12, the workpiece, and the welding torch 46. That is, in general, the welding system 10 may provide for current flow via the workpiece to the power source 12.

During operation, in addition to the frequency of the current, the power source 12 may vary the amperage of the current output to the torch 46. The setting for the amperage output by the power source 12 may be adjusted by a setting a knob or button or other input device on the control panel 22 of the power source 12, on the interface provided on the personal computer 38, or may be set by a remote control that communicates with the welding power source 12 via a wireless receiver 48. For example, in certain embodiments, the welding system 10 may include a foot pedal remote control that enables the operator to make current adjustments during welding by either holding down the foot pedal or feathering the foot pedal remote control to vary the amperage. The remote control may also include a finger tip control, audible command, or other form of input to signal the power source 12 to output a corresponding current. In such embodiments, the weld controller 20 may receive input from the remote device, the user interface 22, the control circuitry 30, or a combination thereof, and determine an appropriate control scheme for the welding power source 12.

In addition, although not depicted in FIG. 1, the torch 46 may be supplied with a shielding gas from a gas source. In general, the shielding gas may be supplied to the torch 46 and expelled from the torch at the location of the weld. The shielding gas may be expelled immediately prior to striking the welding arc, throughout welding, and/or until shortly after the welding arc is extinguished. The shielding gas protects the welding area from atmospheric gases such as nitrogen and oxygen, which may cause fusion defects, porosity, and weld metal embrittlement. The shielding gas may also transfer heat from the welding electrode to the metal and may help to start and maintain a stable arc.

The welding system depicted in FIG. 1 includes the user interface 22 disposed thereon. However, it should be noted that in other embodiments, the personal computer 28 may be configured to remain docked with the power source 12 during all modes of operation and may provide the user with the only user interface available for control of the system. For example, in the embodiment of the welding system 10 illustrated in FIG. 2, the welding power source 12 does not include the user interface 22. Accordingly, when the user sets up the system for welding or desires to change a weld parameter, the user utilizes the interface provided by the personal computer 28.

Figure 2:
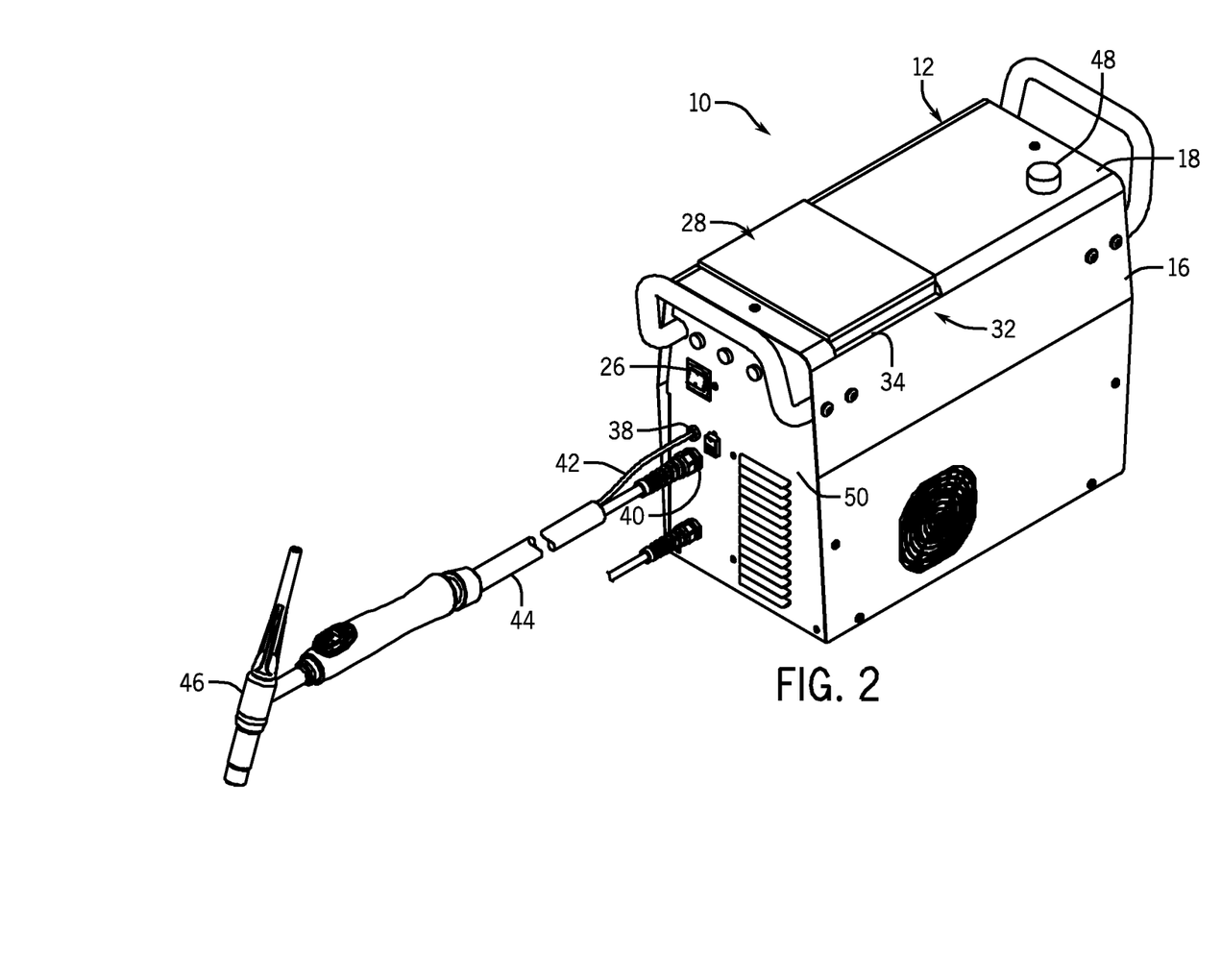
FIG. 2 is a perspective view of an embodiment of a welding system including a welding power source and a personal computer docked in the welding power source.

Further, it should be noted that the welding power source 12 is susceptible to a variety of implementation-specific variations not illustrated herein. For instance, in some instances, the welding power source 12 may be configured to interface with a variety of weld accessories or devices. To that end, for example, as shown in FIG. 2, the welding power source 12 may include features, such as bracket 50, that enable the coupling of other devices to the power source 12.

Figure 3:
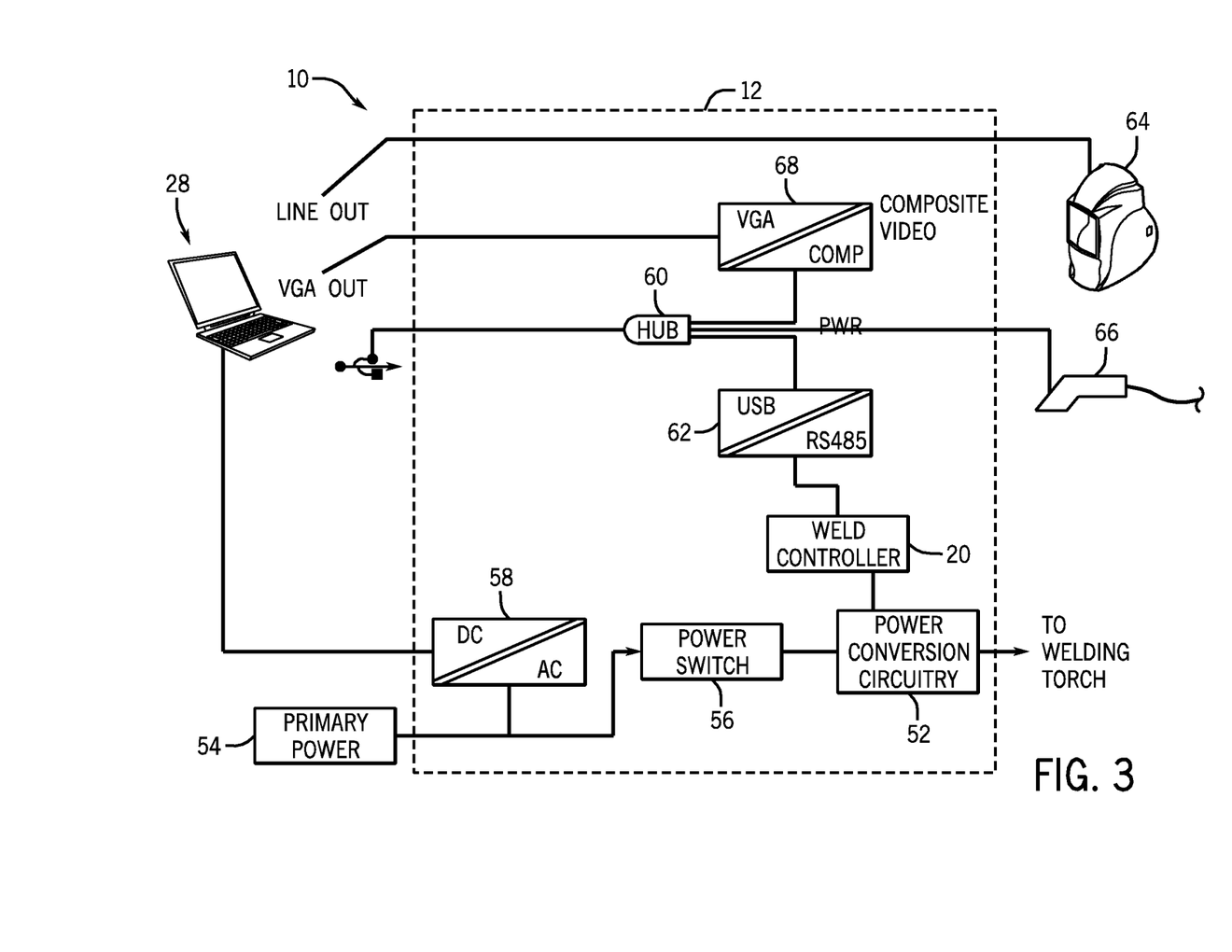
FIG. 3 is a schematic illustrating an exemplary internal composition of an embodiment of a welding power source having a personal computer docked therein.

FIG. 3 is a schematic illustrating an example internal composition of an embodiment of the welding power source 12 and one manner in which the power source 12 may interface with the electronics of the personal computer 28. Examples of suitable internal components included in the welding power source 12 that are consistent with one presently disclosed embodiment are shown. However, it should be noted that the particular components included in the welding power source 12 and the personal computer 28 of the illustrated welding system 10 are subject to a variety of implementation-specific variations that are within the scope of presently disclosed embodiments. That is, more or fewer components may be included in other embodiments, depending on features of the given application.

In the illustrated embodiment, the welding power source 12 includes power conversion circuitry 52 that receives input power from a primary power source, such as alternating current power source 54 (e.g., the AC power grid, an engine/generator set, a battery, or a combination thereof) via a power switch 56. The power applied to the power conversion circuitry 52 may originate in a power grid, although other sources of power may also be used, such as power generated by an engine-driven generator, batteries, fuel cells or other alternative sources. After receiving the input power, the power conversion circuitry 52 conditions the input power, and provides output power to power one or more welding devices (e.g., welding torch assembly 46) in accordance with demands of the system 10. Accordingly, in some embodiments, the power conversion circuitry 52 may include circuit elements, such as transformers, rectifiers, switches, and so forth, capable of converting the AC input power to a direct current electrode positive (DCEP) or direct current electrode negative (DCEN) output, as dictated by the demands of the system 10.

In order for the personal computer 28 to operate off of the supply power for the power source 12, in the embodiment of FIG. 3, an alternating current to direct current (AC/DC) power supply 58 is spliced into the power input circuit for the welding power source 12 at a location between the AC power source 54 and the power switch 56. The foregoing location of the AC/DC converter may enable the personal computer 28 to utilize the primary power 54 even in instances in which the welding power source 12 is powered OFF. For example, in some embodiments, the personal computer 28 may include an energy storage device, and the energy storage device may utilize the primary power 54 to charge, for example, when the power source 12 is turned OFF. However, it should be noted that in other embodiments, the personal computer 28 may receive power from a separate primary source of power, an internal battery, or any other source of power to which it is coupled.

The illustrated welding power source 12 also includes the weld controller 20, which is configured to receive and process a plurality of inputs regarding the performance and demands of the system 10. The weld controller 20 may include a variety of suitable components, such as processing circuitry and memory. The memory may include volatile or non-volatile memory, such as read only memory (ROM), random access memory (RAM), magnetic storage memory, optical storage memory, or a combination thereof. Furthermore, a variety of control parameters may be stored in the memory along with code configured to provide a specific output (e.g., initiate wire feed, enable gas flow, etc.) during operation.

During operation, the weld controller 20 may receive one or more inputs from the operator interface 22 and/or the personal computer 28 regarding user preferences with regard to a desired welding process and desired parameters (e.g., voltages, currents, particular pulsed or non-pulsed welding regimes, and so forth). Although not shown in FIG. 3, in certain embodiments, the weld controller 20 may also be coupled to gas control valving, which regulates the flow of shielding gas from a gas cylinder to the torch 46 in applications in which shielding gas is desired. In general, such gas is provided at the time of welding, and may be turned on immediately preceding the weld and for a short time following the weld.

Based on such inputs received from the operator, the weld controller 20 operates to control generation of welding power output for carrying out the desired welding operation, for example, via control signals transmitted to the power conversion circuitry 52. Based on such control commands, the power conversion circuitry 52 is configured to create the output power that will ultimately be applied to the welding electrode at the torch 46. To this end, as noted above, various power conversion circuits may be employed, including choppers, boost circuitry, buck circuitry, inverters, converters, and so forth.

A variety of internal components are provided in the welding power source 12 to enable the personal computer 28 to interface with the power source 12 and one or more weld accessory devices. For example, a universal serial bus (USB) hub 60 is provided to enable connection of the power source 12 to the personal computer 28 via a centralized connection point. The USB hub 60 may be susceptible to a variety of implementation-specific configurations. For example, the USB hub 60 may include any desired number of ports, be configured as a self powered device, be configured to operate off the weld power input, and so forth.

Further, a RS485 to USB converter 62 may be provided to enable the software in the personal computer 28 to emulate the operator interface 22 through one of the personal computer's COM ports when communicating with the weld controller 20. In this way, the personal computer 28 may be utilized to communicate setup parameters to the weld controller 20. It should be noted that, as discussed in more detail below, the converter 62 may be utilized in combination with other components to retrofit existing power sources 12 to utilize the personal computer 28 as a user interface.

Still further, it should be noted that the power source 12 may be configured to interface with one or more weld accessory devices, such as welding helmet 64 and bar code reader 66. The bar code reader 66 may be utilized, for example, to scan a part number associated with one or more weld materials or components. The welding helmet 64 may be worn by a welding operator when the system is in operation to facilitate the welding process. In certain embodiments, the welding helmet 64 may include a heads up display, which may be located, for example, in the periphery of the operator's field of view to display information corresponding to one or more weld variables to the operator. Further, in some embodiments, the personal computer 28 may communicate with the welding helmet 64 to indicate when to darken or lighten the lens, for example, when a welding operating begins and ends. To enable the transfer of data from the personal computer 28 to the welding helmet 64, a video converter 68 is provided. During operation, the video converter 68 converts the video graphics array (VGA) video feed from the personal computer 28 into a composite signal that the welding helmet 64 is capable of displaying. In the illustrated embodiment, the video converter 68 is powered off of the USB hub 60.

Figure 4:
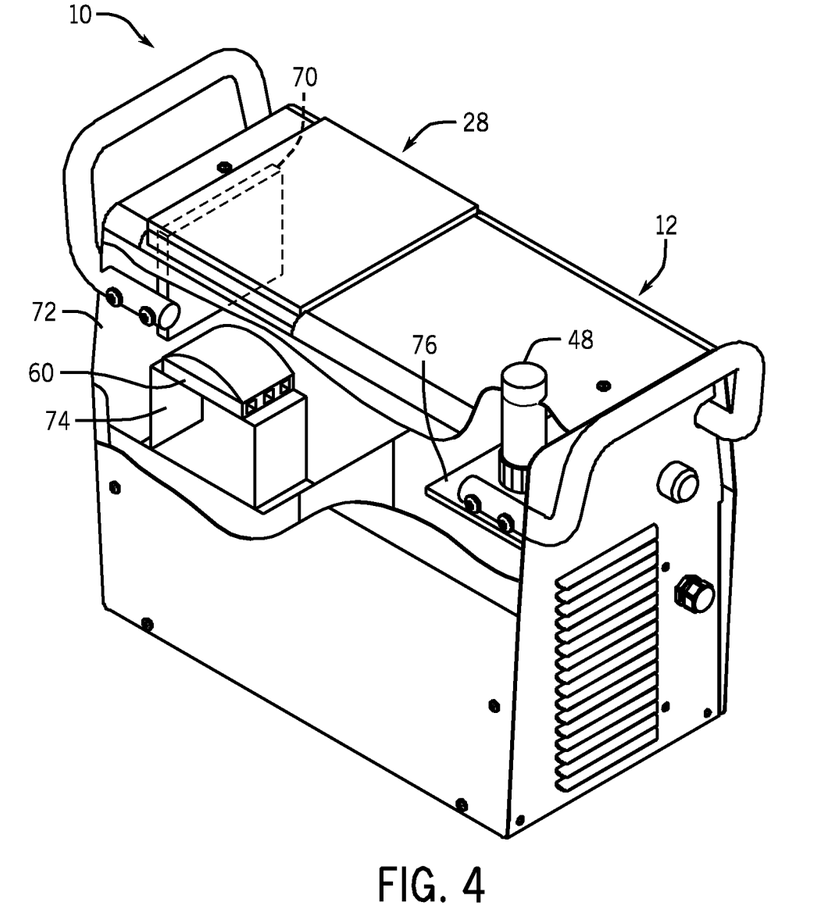
FIG. 4 is a perspective view of an embodiment of the welding power source of FIGS. 1 and 2 having one or more converters disposed therein.

FIG. 4 is a perspective view of an embodiment of the welding power source 12 having a side cover removed to expose an example configuration of the internal components. In the illustrated embodiment, an enclosure 70 encloses the converters 62 and 68 and is coupled to an inner surface 72 of the front panel of the power source 12. In embodiments in which the control panel 22 is completely replaced by the personal computer 28 as the sole user interface, the enclosure 70 may replace the control panel electronics. Further, a first mounting bracket 74 supports the USB hub 60, and a second mounting bracket 76 supports the wireless receiver 48. However, it should be noted that the illustrated configuration is merely an example, and the foregoing components may be integrated in any desirable implementation-specific manner.

Figure 5:
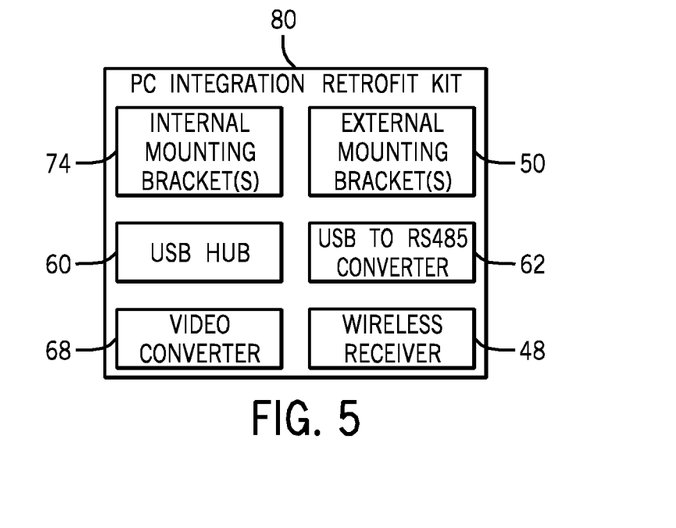
FIG. 5 is a schematic illustrating an embodiment of a personal computer retrofit kit suitable for retrofitting an existing welding system.

Additionally, it should be noted that in certain embodiments, preexisting welding systems may be modified to include the personal computer 28 as a suitable user interface. To that end, as shown in FIG. 5, in some embodiments, some or all of the foregoing components may be provided as part of a retrofit kit 80 designed to enable an operator to convert a non-personal computer based welding system to a personal computer based welding system. For example, the retrofit kit 80 may include components such as, but not limited to, internal mounting brackets 74, the USB hub 60, the video converter 68, external mounting brackets 50, the USB to RS485 converter 62, and/or the wireless receiver 48.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
a welding power source comprising:
power conversion circuitry configured to receive input power from a primary power source and generate a welding power output for use in a welding operation,
a weld controller configured to control the power conversion circuitry,
a power switch having an on setting and an off setting, wherein the power switch is positioned in series between the primary power source and the power conversion circuitry such that input power to the power conversion circuitry may be switched off by the power switch when the power switch is in the off setting, and
a computer power supply configured to receive the input power from the primary power source and modify the input power to generate a computer power output, wherein the computer power supply is positioned in parallel with the power switch such that the computer power supply may continue to receive the input power when the power switch is in the off setting; and
a personal computer integrated with the welding power source, the personal computer configured to coordinate control of the welding operation based on operator input, the personal computer further configured to connect to, and receive power from, the computer power supply.

2. The welding system of claim 1, wherein the plurality of activatable interface devices comprise knobs, displays, buttons, or a combination thereof.

3. The welding system of claim 1, further comprising at least one bracket configured to be coupled to an inside surface of a housing of the welding power source and to receive the USB hub.

4. The welding system of claim 1, wherein the computer power supply comprises an alternating current (AC) to direct current (DC) power supply.

5. The welding system of claim 1, wherein the welding power source further comprises a USB hub in electrical communication with the weld controller through a USB to RS485 converter, and the personal computer further comprises a USB port configured for electrical connection with the USB hub, the personal computer configured to coordinate control of the welding operation via communication with the weld controller through the USB port, USB hub, and USB to RS485 converter.

* * * * *